(12) United States Patent
McCall et al.

(10) Patent No.: US 8,193,915 B2
(45) Date of Patent: Jun. 5, 2012

(54) MULTIPLE TRANSCEIVER SYNCHRONOUS COMMUNICATION SYSTEM

(75) Inventors: Clark E. McCall, Ann Arbor, MI (US); David T. Proefke, Madison Heights, MI (US); William A. Biondo, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1125 days.

(21) Appl. No.: 12/043,732

(22) Filed: Mar. 6, 2008

(65) Prior Publication Data

US 2009/0224876 A1 Sep. 10, 2009

(51) Int. Cl.
*H04Q 5/22* (2006.01)

(52) U.S. Cl. ............ 340/10.34; 340/426.36; 340/426.35; 340/5.61; 340/5.63; 340/7.38; 340/7.37; 340/10.33; 340/10.4; 340/10.3; 340/10.1

(58) Field of Classification Search ................. 340/5.61, 340/7.38, 426.36, 426.35, 5.63, 7.37, 10.34, 340/10.33, 10.4, 10.3, 10.1

See application file for complete search history.

(56) References Cited

U.S. PATENT DOCUMENTS 4,484,028 A * 11/1984 Kelley et al. ............. 379/93.14
5,252,963 A * 10/1993 Snowden et al. ............ 340/7.38

(Continued)

FOREIGN PATENT DOCUMENTS
WO WO 03063517 A2 * 7/2003

OTHER PUBLICATIONS

"Volvo S80 helps to ease security worries"; taken from the Internet at http://www.volvoclub.org.uk/press/releases/2006/personal-car-communicator.shtml; Volvo S80 PCC Press Release Jul. 3, 2006, 2 pages.

*Primary Examiner* — George Bugg
*Assistant Examiner* — Paul Obiniyi
(74) *Attorney, Agent, or Firm* — Ingrassia Fisher & Lorenz, P.C.

(57) ABSTRACT

A vehicle transceiver module is provided for use in a synchronous communication system including the vehicle transceiver module and one or more key fobs, each of the key fobs including a key fob transceiver for transmitting and receiving signals. The vehicle transceiver module includes transceiver circuitry, a controller, a storage device and power control circuitry. The transceiver circuitry receives the signal transmitted by the key fob transceiver and provides it to the controller. The controller is coupled to the transceiver for determining an offset value associated with one of the key fobs in response to an offset time duration between a reception time of the signal from the key fob and a first expected reception time of the signal from the key fob. The storage device is coupled to the controller for receiving the offset value associated with the key fob from the controller and stores the offset value along with information identifying the key fob. The power control circuitry is coupled to the transceiver circuitry for providing operational power thereto. In addition, the controller is also coupled to the power control circuitry and provides a begin transmission signal thereto to power up the transceiver circuitry for transmission of a signal to the key fob at a transmission start time determined by the controller in response to the offset value associated with the key fob and a second expected reception time.

20 Claims, 12 Drawing Sheets

U.S. PATENT DOCUMENTS

| | | | |
|---|---|---|---|
| 5,551,078 A * | 8/1996 | Connell et al. | 455/343.3 |
| 5,566,081 A * | 10/1996 | Yoshizawa et al. | 340/7.38 |
| 5,710,798 A * | 1/1998 | Campana, Jr. | 375/347 |
| 5,745,532 A * | 4/1998 | Campana, Jr. | 375/347 |
| 5,799,256 A * | 8/1998 | Pombo et al. | 455/574 |
| 5,862,472 A * | 1/1999 | Park | 455/411 |
| 5,898,828 A * | 4/1999 | Pignolet et al. | 714/6.1 |
| 5,952,937 A * | 9/1999 | Koopman et al. | 340/12.54 |
| 6,072,433 A * | 6/2000 | Young et al. | 342/386 |
| 6,236,333 B1 * | 5/2001 | King | 340/5.61 |
| 6,377,813 B1 * | 4/2002 | Kansakoski et al. | 455/522 |
| 6,470,005 B1 * | 10/2002 | Knutson et al. | 370/347 |
| 6,812,884 B2 * | 11/2004 | Richley et al. | 342/125 |
| 6,826,390 B1 * | 11/2004 | Tamura | 455/226.1 |
| 6,856,611 B2 * | 2/2005 | Chaudhuri et al. | 370/335 |
| 6,947,721 B2 * | 9/2005 | Pritchett et al. | 455/343.1 |
| 7,183,750 B2 * | 2/2007 | Asada | 322/59 |
| 7,256,684 B1 * | 8/2007 | Cafiero et al. | 340/12.32 |
| 7,277,457 B2 * | 10/2007 | Gorday et al. | 370/509 |
| 7,751,781 B2 * | 7/2010 | Kim | 455/67.14 |
| 7,822,403 B2 * | 10/2010 | Tamura | 455/334 |
| 2002/0009983 A1 * | 1/2002 | Pritchett et al. | 455/260 |
| 2002/0030591 A1 * | 3/2002 | Paranjpe | 340/436 |
| 2003/0210713 A1 * | 11/2003 | Abdel-Ghaffar | 370/503 |
| 2004/0017777 A1 * | 1/2004 | Chaudhuri et al. | 370/241 |
| 2004/0178947 A1 * | 9/2004 | Richley et al. | 342/118 |
| 2004/0266360 A1 * | 12/2004 | Hamalainen et al. | 455/67.16 |
| 2005/0033902 A1 * | 2/2005 | Tamura | 711/2 |
| 2005/0074036 A1 * | 4/2005 | Gorday et al. | 370/513 |
| 2005/0185733 A1 * | 8/2005 | Tolli et al. | 375/285 |
| 2006/0072586 A1 * | 4/2006 | Callaway et al. | 370/395.62 |
| 2006/0135077 A1 * | 6/2006 | Kim | 455/67.14 |
| 2006/0188010 A1 * | 8/2006 | Pritchett et al. | 375/219 |
| 2006/0262754 A1 * | 11/2006 | Andersson et al. | 370/332 |
| 2009/0041103 A1 * | 2/2009 | Shi | 375/222 |
| 2009/0243796 A1 * | 10/2009 | Tieman | 340/5.72 |
| 2010/0052931 A1 * | 3/2010 | Kolpasky et al. | 340/670 |
| 2010/0093282 A1 * | 4/2010 | Martikkala et al. | 455/63.4 |
| 2010/0172339 A1 * | 7/2010 | Duan et al. | 370/350 |
| 2010/0305779 A1 * | 12/2010 | Hassan et al. | 701/2 |
| 2011/0026650 A1 * | 2/2011 | Molina et al. | 375/344 |

* cited by examiner

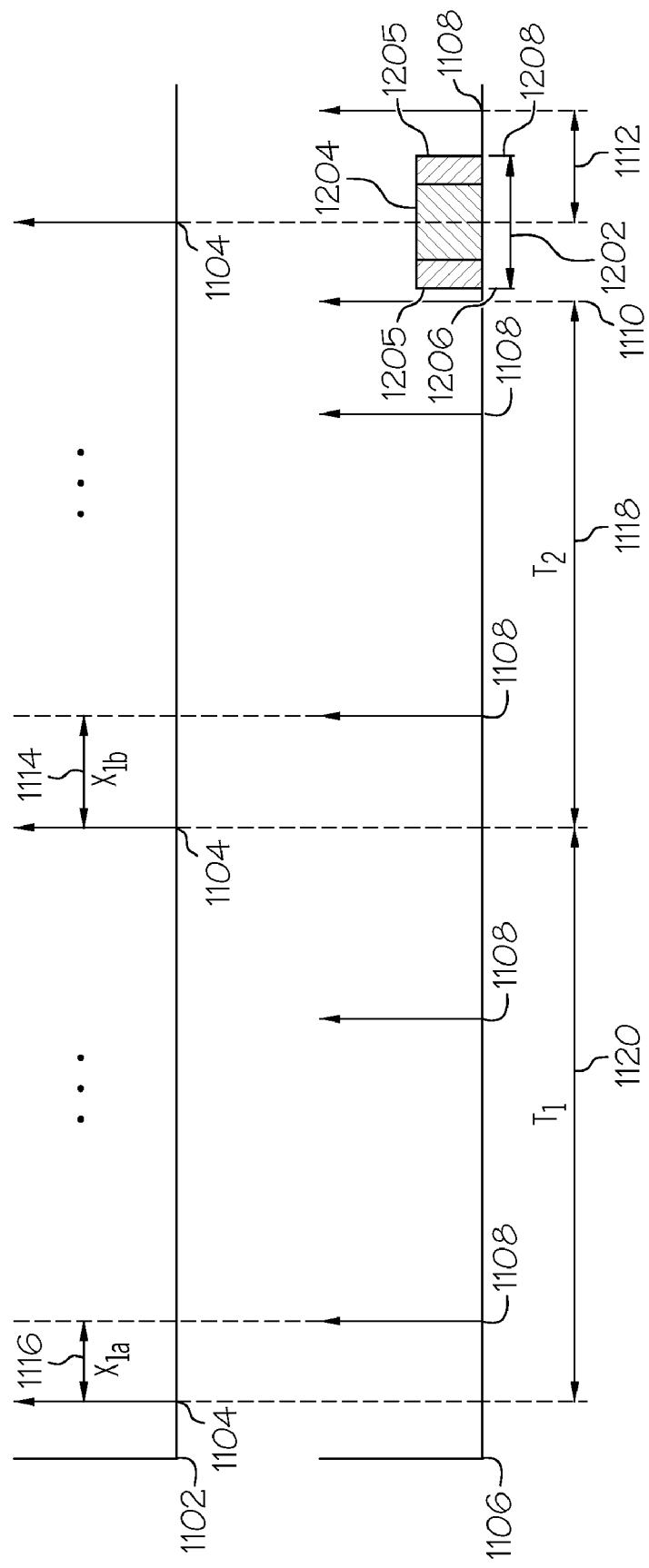

MULTIPLE TRANSCEIVER SYNCHRONOUS COMMUNICATION SYSTEM

TECHNICAL FIELD

The present invention generally relates to synchronous communication systems, and more particularly relates to a method and apparatus for multiple transceiver synchronization in a multiple transceiver synchronous communication system.

BACKGROUND OF THE INVENTION

Portable communication devices generally use power conservation strategies having duty cycles of alternating power on and power off times to prolong the life of an energy storage device, such as a battery. Many of today's automobiles have a portable communication device such as an automobile transceiver module which receives radio frequency (RF) communications from one-way communicating key fobs for functions such as automobile door unlock. Two-way communicating key fobs which include a RF transceiver capable of both transmitting signals to and receiving signals from the automobile transceiver module can provide additional remote functionality but are preferably designed with low complexity and power conservation for small size in order to be easily hand held and low power consumption design tolerance to provide long battery life.

While a short duty cycle on the RF transceiver of the automobile transceiver module reduces the energy use below that of a continuously operating transceiver so that the automobile's battery is not drained by the transceiver module's operation, the period of power control is sufficiently short to allow for vehicle functionality in response to a key fob with very low latency. Use of a similar duty cycle and power control period for the RF transceiver of the key fob would quickly drain a small battery thereof. The key fob's RF transceiver should be capable of providing reliable communication with the automobile transceiver module without undue power consumption of the key fob's battery. In addition, sufficient range capability between the vehicle and the key fob greatly reduces concerns with system latency for the automatic communication of vehicle information to the key fob. Thus, a power conservation strategy having a relatively low duty cycle and a long period can be utilized by the key fob without significantly impacting the usefulness of the radio frequency communication system. Therefore, to accommodate the relatively low duty cycle operation of the key fob transceiver circuitry for signal reception, communications between the vehicle transceiver and the key fob transceiver circuitry should be synchronized to minimize power consumption.

Accordingly, it is desirable to provide a vehicle transceiver module with a power conservation duty cycle which quickly detects signals from key fob transceivers during power on times to minimize energy consumption and a key fob transceiver which detects signals from the vehicle transceiver with increased latency but significantly reduced power consumption. In addition, it is desirable to provide a method for synchronous communication systems which provides power conservation while providing for quick synchronization between multiple transceivers. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A vehicle transceiver module is provided for use in a synchronous communication system including the vehicle transceiver module and one or more key fobs, each of the one or more key fobs including a key fob transceiver for transmitting and receiving signals. The vehicle transceiver module includes transceiver circuitry, a controller, a storage device and power control circuitry. The vehicle transceiver circuitry receives the signal transmitted by the key fob transceiver. The controller is coupled to the transceiver for determining an offset value associated with one of the one or more key fobs in response to an offset time duration between a reception time of the signal from the one of the one or more key fobs and a first expected reception time of the signal from the one of the one or more key fobs. The storage device is coupled to the controller for receiving the offset value associated with the one of the one or more key fobs from the controller and stores the offset value along with information identifying the one of the one or more key fobs. The power control circuitry is coupled to the transceiver circuitry for providing operational power thereto. In addition, the controller is also coupled to the power control circuitry and provides a begin reception signal to the power control circuitry to power up the transceiver circuitry for reception of a signal from one of the one or more key fobs at a reception start time determined by the controller in response to the offset value associated with the one of the one or more key fobs and a second expected reception time.

Also a key fob is provided for two-way communication with a vehicle transceiver module including a vehicle transceiver for transmitting a first radio frequency (RF) signal. The key fob includes transceiver circuitry, power control circuitry, a motion detection device and a controller. The transceiver circuitry receives the first RF signal transmitted by the vehicle transceiver and transmits a second RF signal to the vehicle transceiver. The power control circuitry is coupled to the transceiver circuitry and provides operational power thereto in response to receiving a transceiver power control signal. The motion detection device generates a motion detected signal in response to detecting movement of the key fob, and the controller is coupled to the motion detection device and the power control circuitry and provides the transceiver power control signal to the power control circuitry only within a predetermined time period after receiving the motion detected signal from the motion detection device.

In addition, a method is provided for power conservation in a first transceiver in synchronous communication with a second transceiver. The method includes the steps of determining an offset value for the second transceiver in response to an offset time duration between a reception time of a signal from the second transceiver and a first expected reception time of the signal from the second transceiver, and storing the offset value along with information identifying the second transceiver. The method further includes the step of powering up the first transceiver for transmission of a signal to the second transceiver at a reception start time determined in response to the offset value and a second expected reception time.

DESCRIPTION OF THE DRAWINGS

The present invention will hereinafter be described in conjunction with the following drawing figures, wherein like numerals denote like elements.

FIG. 12 illustrates a timing chart of a power conservation operation of the vehicle transceiver module of FIG. 2 in accordance with a fourth alternate embodiment of the present invention.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
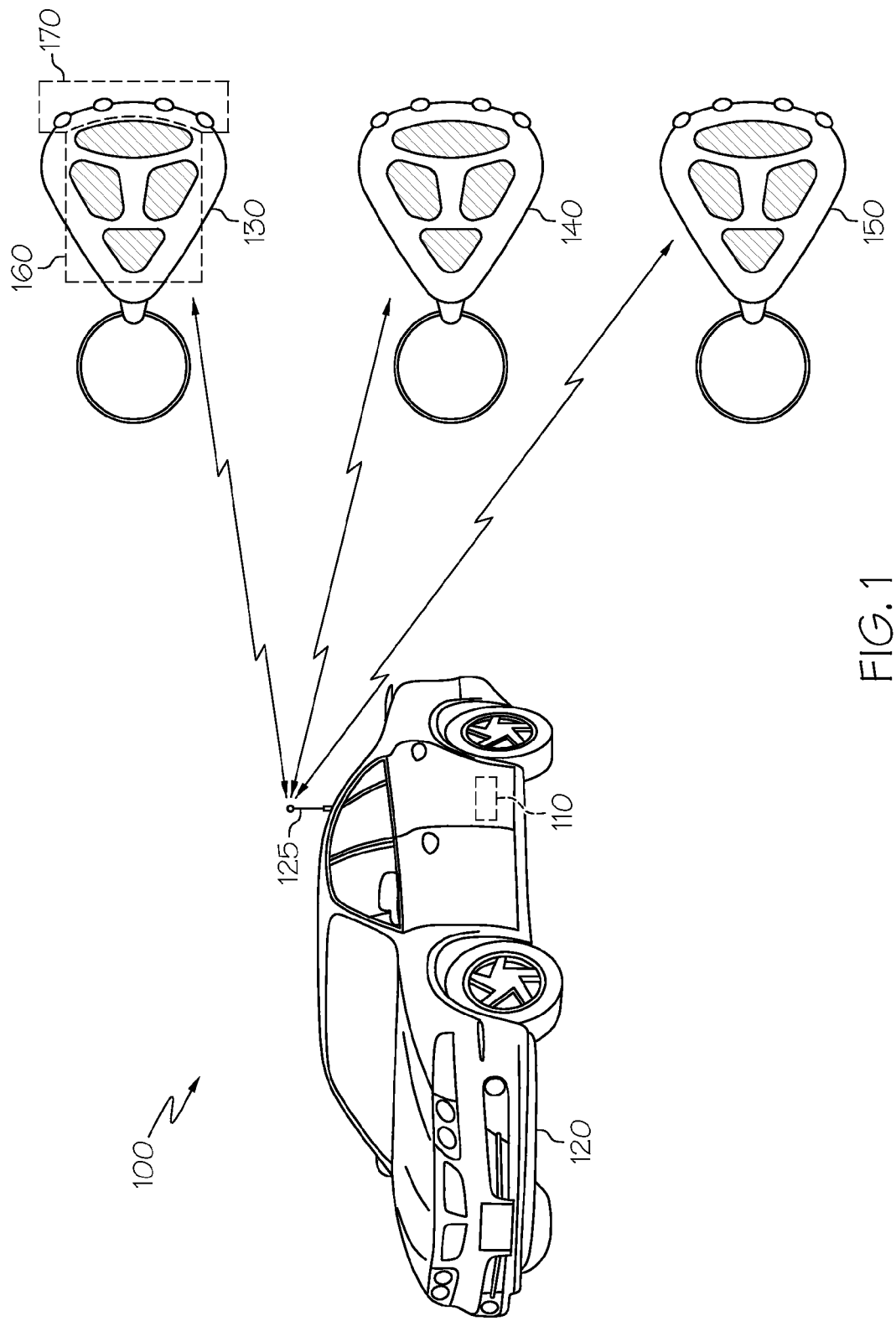
FIG. 1 illustrates system for synchronous communication in accordance with an embodiment of the present invention.

Referring to FIG. 1, a synchronous communication system 100 in accordance with an embodiment of the present invention includes a vehicle transceiver module 110 in a vehicle 120 having an antenna 125. The vehicle transceiver module 110 communicates with two-way communicating smart key fobs 130, 140, 150. While three smart key fobs 130, 140, 150 are shown, the vehicle can have only one key fob or any number of key fobs associated therewith for operation in accordance with the present embodiment. Each of the one or more smart key fobs 130, 140, 150 include a plurality of user input devices 160 and one or more user alert devices 170. The user input devices 160 are typically depressable user input buttons and the user alert devices 170 are one or more sensible alert devices, such as visibly distinguishable light emitting diodes (LEDs) or a display device such as a liquid crystal display (LCD). In addition to or in place of visible alert devices, the user alert devices 170 could include one or more other sensible alerts devices such as audible alert devices (or an audible alert device with multiple alert tones) or tactile alert devices such as a vibratory alert device. Also, while four user input devices 160 and four user alert devices 170 are shown on the key fobs 130, 140, 150 in FIG. 1, those skilled in the art will realize that the number of user input devices 160 and user alert devices 170 provided on the key fobs 130, 140, 150 will depend upon the functionality of the one or more smart key fobs 130, 140, 150 and that one key fob 130 associated with the vehicle 120 may have more or less user input devices 160 or user alert devices 170 than another key fob 140. In addition to having a single function assigned to each input device 160 or user alert devices 170, a combination of input devices could be used to request a plethora of functions via input device sequences or combinations, or as menu inputs in coordination with a display mechanism.

The smart key fobs 130, 140, 150 provide enhanced functionality such as a push button start and passive entry (i.e., automatic unlocking of the doors of the vehicle 120 in response to detection of one of the key fobs 130, 140, 150 within a predetermined proximate distance of the vehicle 120). Additional vehicle functions that may be activated by the smart key fobs 130, 140, 150 may include vehicle lighting (either or both of external vehicle lighting and internal vehicle lighting), preparation of the vehicle locking system, activation of a vehicle camera for vehicle action in response to camera-detected events, and an enhanced customer feature set such as adjustment of vehicle parameters (e.g., the position of the driver's seat and the tilt of the steering wheel) in response to recognition of a particular key fob 130. Any or all of these functionalities may be activated by a vehicle user activating one or more of the user input devices 160 of one of the key fobs 130, 140, 150 or may be activated automatically by the vehicle 120 detecting that one of the key fobs 130, 140, 150 is within a predetermined proximate distance of the vehicle 120 (e.g., by the vehicle transceiver module 110 detecting a received signal from one of the key fobs 130, 140, 150).

In addition, the vehicle transceiver module 110 can communicate with the smart key fobs 130, 140, 150 to notify the vehicle user that the smart key fob 130, 140 or 150 is within communication distance or some other predetermined distance of the vehicle 120 (e.g., when finding the vehicle utilizing one of the key fobs 130, 140, 150), or to notify the vehicle user that a vehicle event has occurred (e.g., activation of the vehicle security system), or to confirm to the vehicle user that an instruction has been received from the smart key fobs 130, 140, 150 or that an action initiated by one of the smart key fobs 130, 140, 150 has been completed. Such notification to the vehicle user can be provided by activation of an alert to the vehicle user via one or more of the user alert devices 170.

While vehicle events whose occurrence is desirable to transmit to the key fobs 130, 140, 150 may occur asynchronously, synchronous communication is employed between the vehicle transceiver module 110 and the key fobs 130, 140, 150 in accordance with the present embodiment for substantial power conservation benefits. The synchronous communication system 100 is designed, in accordance with the present embodiment, so that the vehicle transceiver module 110 is transmitting only during the short window when the transceiver circuitry of key fobs 130, 140, 150 is ON without the need for synchronizing to a real time clock external to the synchronous communication system 100 and information is transmitted to the key fobs 130, 140, 150 after a vehicle event with acceptable delay and without requiring action by the vehicle user.

While synchronization between the vehicle transceiver module 110 and the key fobs 130, 140, 150 could be maintained by each device synchronizing to a device maintaining a standard time, the additional communications necessary for such communication would necessitate additional power consumption, thereby providing additional drain on the energy storage devices (i.e., the batteries) of the vehicle 120 and the key fobs 130, 140, 150. Therefore, in accordance with the present embodiment, the vehicle transceiver module 110 maintains synchronous communication between the key fobs 130, 140, 150 and the vehicle transceiver module 110. The key fobs 130, 140, 150, on the other hand, communicate asynchronously with the vehicle transceiver module 110 such that each of the key fobs 130, 140, 150 will transmit information to the vehicle transceiver module 110 upon user activation thereof. A block diagram of the vehicle transceiver module 110 of the vehicle 120 in accordance with the present embodiment is illustrated in FIG. 2.

Figure 2:
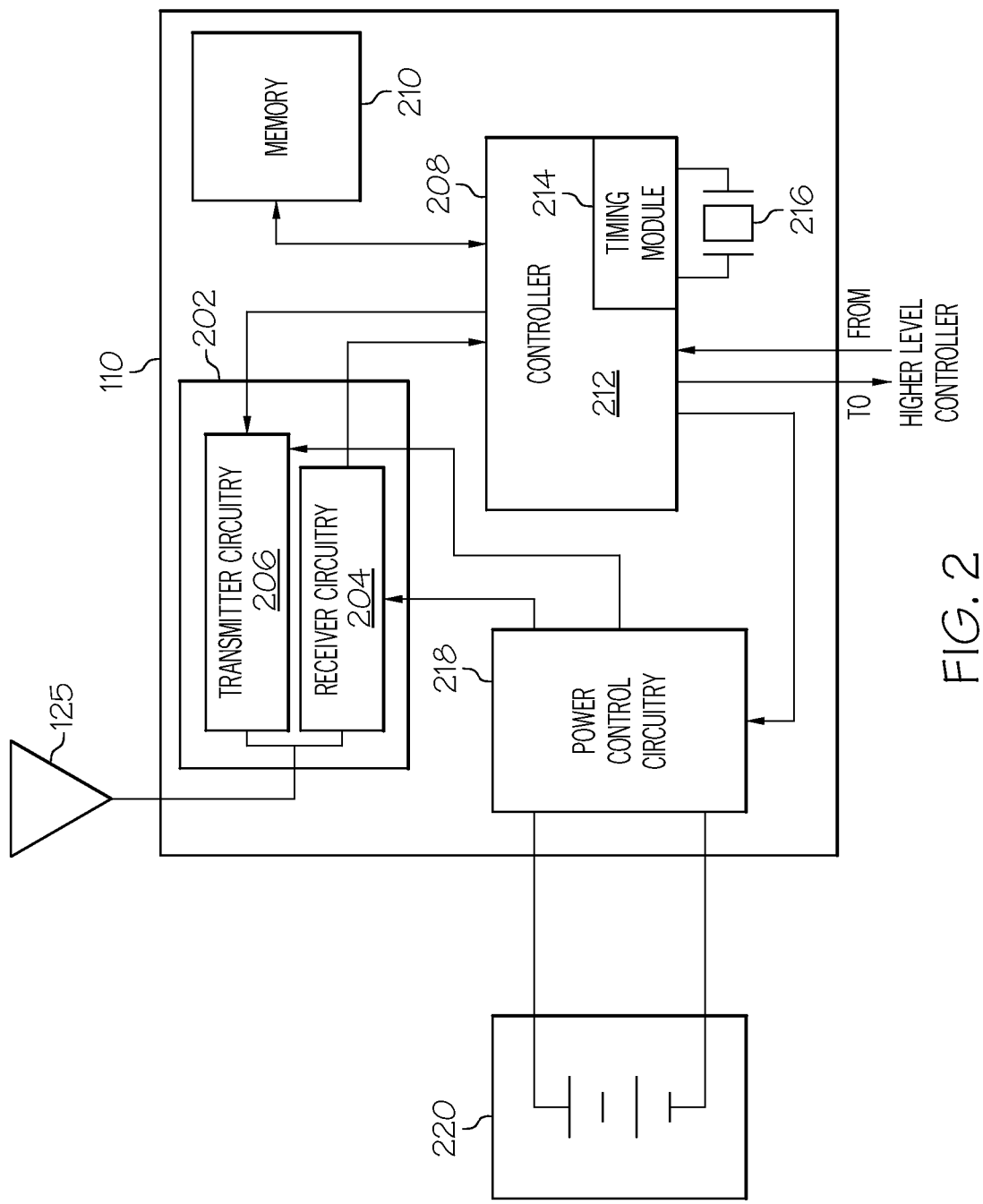
FIG. 2 illustrates a block diagram of a vehicle transceiver module of the system of FIG. 1 in accordance with the embodiment of the present invention.

Referring to FIG. 2, the vehicle transceiver module 110 is coupled to the antenna 125 for receiving and transmitting radio frequency (RF) signals. While the antenna 125 is shown in FIGS. 1 and 2 as being external to the vehicle transceiver module 110 and on the exterior of the vehicle 120, the antenna 125 may also be implemented within the confines of the vehicle 120 or even within the vehicle transceiver module 1 10. The antenna 125 is coupled to transceiver circuitry 202, which includes receiver circuitry 204 and transmitter circuitry 206, in a manner familiar to those skilled in the art. The receiver circuitry 204 demodulates and decodes received RF signals to derive information therefrom and is coupled to a processor 208 to provide the decoded information to thereto for utilization by the processor 208 in accordance with the function(s) of the vehicle transceiver module 110. The processor 208 also provides information to the transmitter circuitry 206 of the transceiver circuitry 202 for encoding and modulating the information into RF signals for transmission via the antenna 125.

The processor 208 is also coupled to a nonvolatile storage device, such as a memory 210, which stores data and operational information for use by the processor 208 to perform the functions of the vehicle transceiver module 110. In accordance with the present embodiment, the memory 210 also stores data for use by a communications controller 212 of the processor 208 to reliably communicate with the key fobs 130, 140, 150. The controller 212 is also coupled to a higher level vehicle controller or controllers (not shown) for receiving command signals therefrom and for providing command signals and other information thereto.

A timing module 214 of the processor 208 is coupled to a crystal 216 and provides timing signals to the controller 212 for maintenance of synchronous communications. While the crystal 216 is depicted as the device for maintaining timing, those skilled in the art will realize that there exist several equivalent methods which may be used to maintain timing for generation of timing signals by the timing module 214.

Power control circuitry 218 is coupled to the vehicle's battery 220 and provides power to components of the vehicle transceiver module 110, such as the transceiver circuitry 202, in accordance with a power control signal received from the controller 212. The power control signal is provided by the controller 212 to the power control circuitry 218 for maintenance of power conservation, such as activation of the transmitter circuitry 206 of the transceiver circuitry 202 for short durations of time in accordance with the present embodiment to minimize the energy consumption thereby. Conventional receivers can make a determination of whether an incoming transmission is intended for them in approximately two milliseconds. In accordance with the present embodiment, the power control circuitry 218 activates the transmitter circuitry 206 in accordance with the power control signal for a time window determined by the controller 212 as a short time duration during which both the transmitter circuitry 206 of the transceiver circuitry 202 and receiver circuitry of one or more of the key fobs 130, 140, 150 would be active.

As time elapses without any communication between the key fobs 130, 140, 150 and the vehicle transceiver module 110, it is expected that the time coordination between key fob communication windows of the key fobs 130, 140, 150 and a vehicle communication window of the vehicle transceiver module 110 would become out of synchronization. Thus, when the controller 212 detects an occurrence of a vehicle event which would trigger communication of information to the key fobs 130, 140, 150, in accordance with the present embodiment, the controller 212 provides a power control signal to the power control circuitry 218 for activation of the transceiver circuitry 202 for a time window determined in response to a determined drift of the key fob communication windows relative to the vehicle communication window to communicate such information to the key fobs 130, 140, 150.

In addition, in accordance with the present invention, the controller 212 determines timing offset information from each communication with one or more of the key fobs 130, 140, 150 and stores the timing offset information in the memory 210 for determination of future drifts of the key fob communication windows relative to the vehicle communication window.

Figure 3:
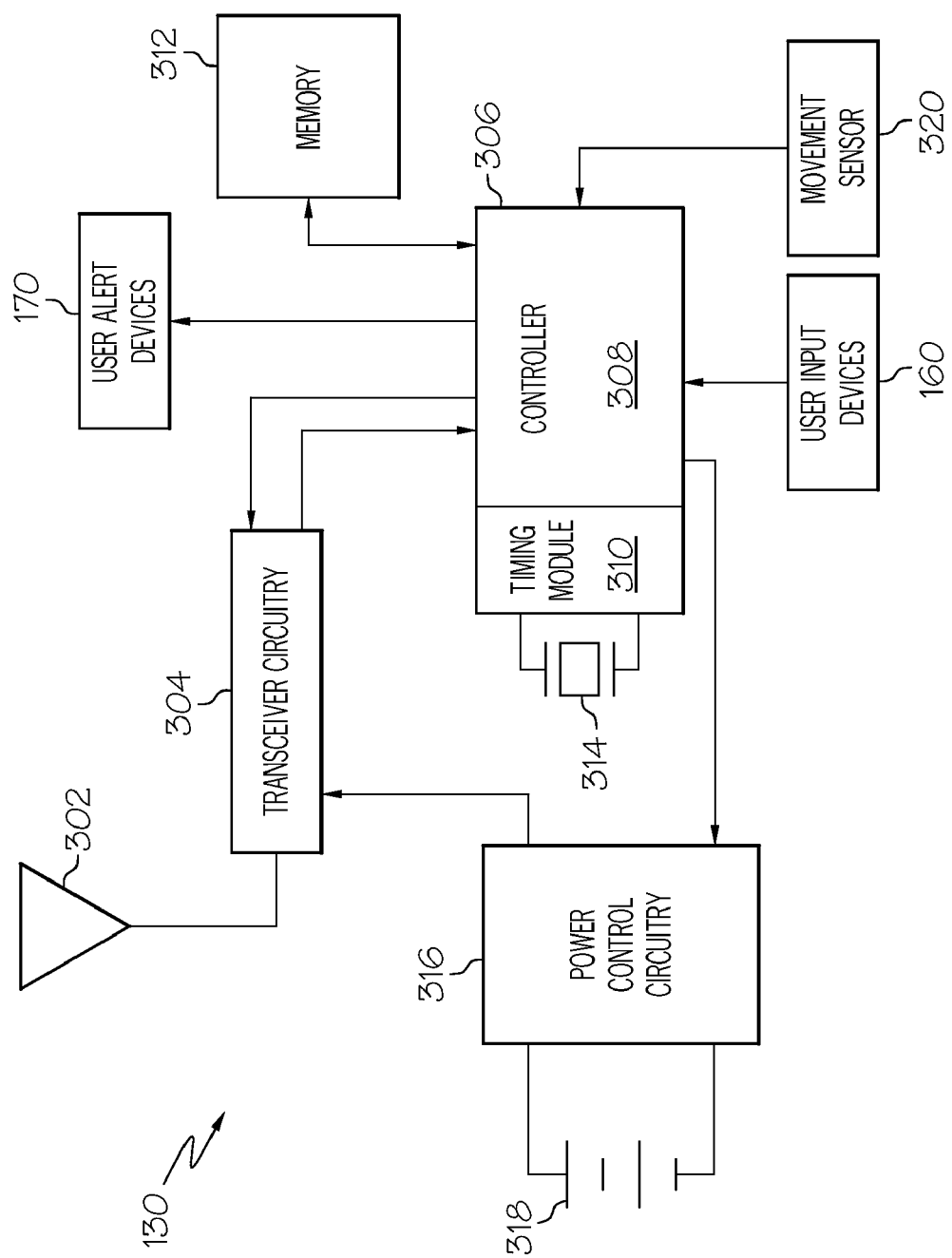
FIG. 3 illustrates a block diagram of a key fob of the system of FIG. 1 in accordance with the embodiment of the present invention.

Referring next to FIG. 3, a block diagram of the key fob 130 in accordance with the present embodiment includes an antenna 302 and transceiver circuitry 304. The transceiver circuitry 304 includes receiver circuitry and transmitter circuitry, the receiver circuitry demodulating and decoding received RF signals to derive information therefrom to provide to a processor 306 for utilization thereby in accordance with the function(s) of the key fob 130 and the transmitter circuitry encoding and modulating information from the processor 306 into RF signals for transmission via the antenna 302.

The processor 306 includes a controller 308 and a timing module 310. The controller 308 is coupled to the user input devices 160 to receive input signals therefrom and is coupled to the user alert devices 170 to provide alert activation signals thereto for providing alerts to a user of the key fob 130. The controller 308 is also coupled to a memory 312 which stores data and operational information for use by the controller 308 to perform the functions of the key fob 130. The timing module 310 is coupled to a crystal 314 and provides timing signals to the controller 308 for maintenance of synchronous communications. While the crystal 314 is depicted as the device for maintaining timing, those skilled in the art will realize that any one of multiple equivalent methods may be used to maintain timing for generation of timing signals by the timing module 310.

Power control circuitry 316 is coupled to a battery 318 and provides power to components of the key fob 130, such as the transceiver circuitry 304, in accordance with a power control signal received from the controller 308. The power control signal is provided by the controller 308 to the power control circuitry 316 for maintenance of power conservation by, for example, activation of receiver circuitry of the transceiver circuitry 304 only for short durations of time in accordance with the present embodiment (i.e., the key fob communication window) to minimize the energy consumption by the transceiver circuitry 304 in order to maximize the life of the battery 318. Transmitter circuitry of the transceiver circuitry 304 is activated by a signal from the controller 308 in response to activation of one of the user input devices 160 or in response to a signal received from the vehicle transceiver module 110.

In accordance with the present embodiment, a motion detection device, such as a movement sensor 320, provides a motion detected signal to the controller 308 in response to detection movement of the key fob 130 to further minimize power consumption by the circuitry of the key fob 130. The key fob 130 is designed such that user alert functions and user utilization of the key fob 130 are available when the key fob 130 is with a vehicle user when the user is moving toward the vehicle 120. Accordingly, the controller 308 utilizes the motion detected signal from the movement sensor 320 (or, more specifically, the lack of the motion detected signal from the movement sensor 320) to place the key fob in a deep sleep power conservation mode when no motion is detected for a predetermined time period. The predetermined time period during which no motion is detected that could trigger the deep sleep mode could be software configurable value representing a full day (twenty-four hours) or, for additional power savings, a time period such as ten hours which would encompass a typical rest period (e.g., the time that the key fob 130 would not be moving while the user is at home) and/or a typical work period (e.g., the time that the key fob 130 would not be moving while the key fob 130 is in the user's coat while the user is at work).

Thus, in accordance with the present embodiment, the controller 308 provides the power control signal to the power control circuitry 316 to enable the receive functions of the transceiver circuitry 304 only when the key fob 130 is in motion and for a predetermined time (e.g. ten or twenty-four hours) after the movement sensor 320 detects motion. Further, the controller 308 utilizes the ability of the transceiver circuitry 304 to make determinations of whether a transmission is intended for the key fob 130 in two milliseconds by defining a power control duty cycle wherein the controller 308 provides a power control signal to the power control circuitry 316 to activate the receiver circuitry of the transceiver circuitry 304 after a predetermined power conservation time (e.g., ten seconds) for a very short key fob communication window (e.g. two to three milliseconds).

Figure 4:
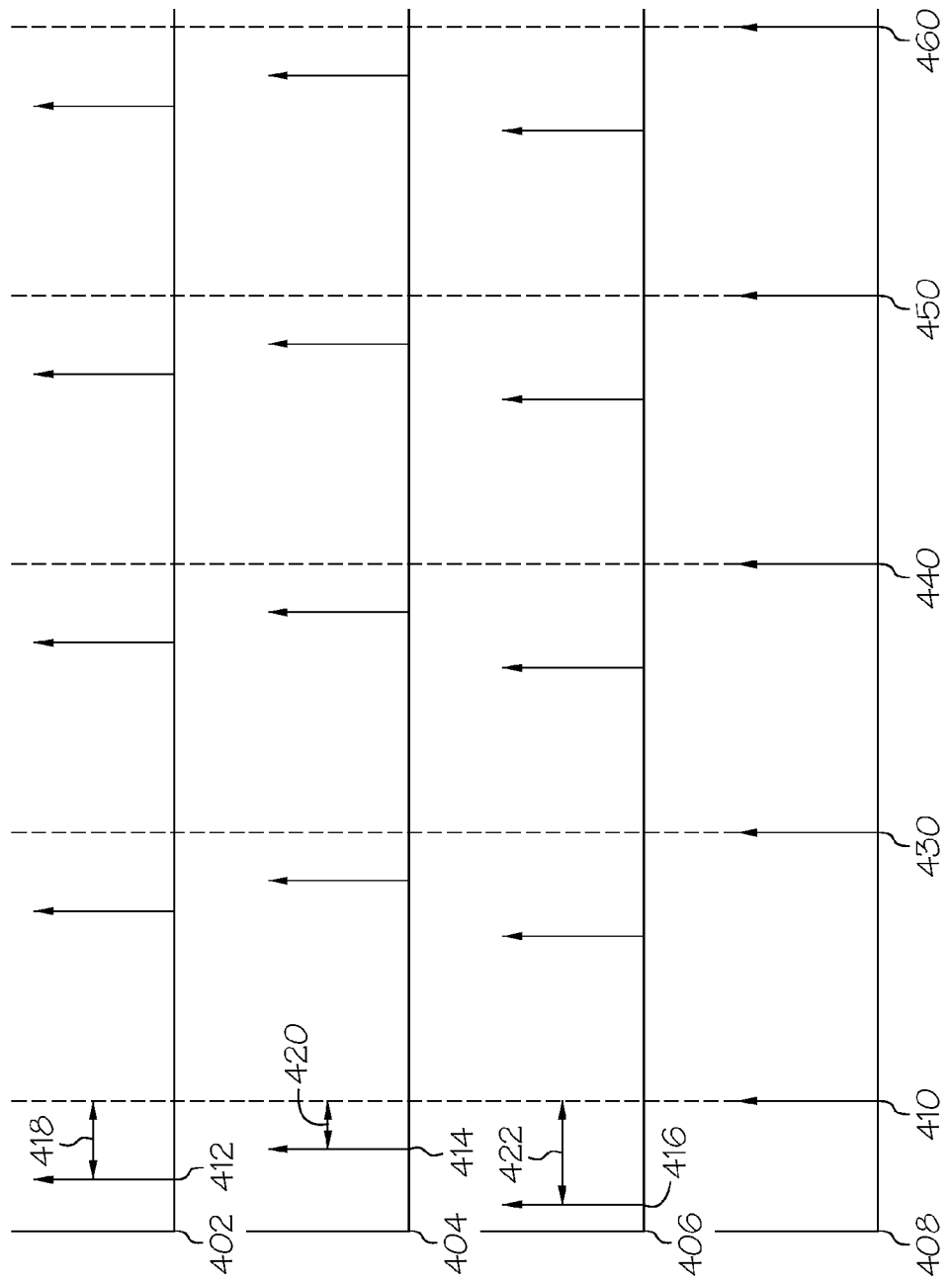
FIG. 4 illustrates a first timing chart of the operation of the controller of the vehicle transceiver module of FIG. 2 for power conservation in accordance with the embodiment of the present invention.

Referring to FIG. 4, a timing chart 400 depicts signaling for the key fob 130 as received by the controller 212 of the vehicle transceiver module 110 on line 402, signaling for the key fob 140 as received by the controller 212 on line 404, signaling for the key fob 150 as received by the controller 212 on line 406, and signaling for the controller 212 of the vehicle transceiver module 110 on line 408.

At a communication time 410, the controller 212 determines from the timing signal generated by the timing module 214 that it is time to activate the transceiver circuitry 202 for synchronous communication with the key fobs 130, 140, 150. However, in the synchronous communication system 100, the actual communication times 412, 414, 416 of the key fobs 130, 140, 150, respectively, drift relative to the expected communication time 410. The controller can measure offset time durations 418, 420, 422 for each of the key fobs 130, 140, 150, where the offset time durations are time durations which can be used to compensate for the relative drift in the synchronous communication system 100.

The controller 212 stores offset values representative of the offset time durations 418, 420, 422 in respective locations of the memory 210 along with information identifying the one of the key fobs 130, 140, 150 associated with the offset value. The stored offset values are used by the controller 212 at future communication times 430, 440, 450, 460 to synchronize the power conservation duty cycle of the controller 212 with the power conservation duty cycle of the key fobs 130, 140, 150 such that the transmitter circuitry 206 of the vehicle transceiver module 110 will be activated (i.e., powered ON) when the transceiver circuitry 304 of each of the key fobs 130, 140, 150 is active.

Figure 5:
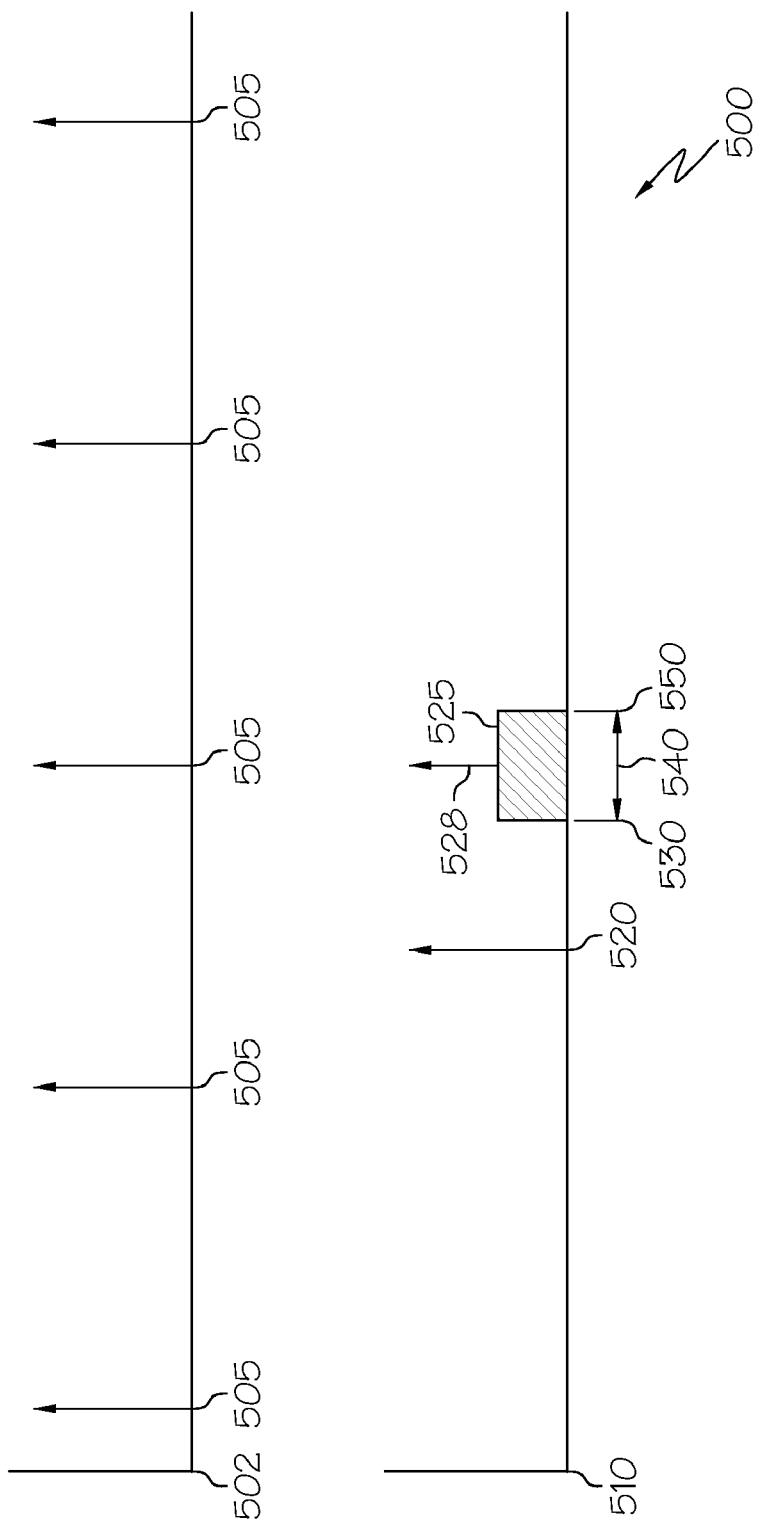
FIG. 5 illustrates a second timing chart highlighting features of the power conservation operation of the vehicle transceiver module of FIG. 2 in accordance with the embodiment of the present invention.

Referring to FIG. 5, a timing chart 500 depicts the operation of the controller 212 for power conservation in accordance with the present embodiment. On line 502, the controller receives timing signals 505 from the timing module 214 which designate an expected synchronization time for synchronous communication with the key fobs 130, 140, 150. On line 510, the controller 212 receives a signal 520 indicating the occurrence of a vehicle event which occurrence will be communicated to the key fobs 130, 140, 150.

Since the signal 520 is asynchronous relative to the synchronous communication between the controller 212 and the key fobs 130, 140, 150, the controller 212, in accordance with the present embodiment, controls the transmitter circuitry 206 to transmit a signal indicating the occurrence of the vehicle event to the key fobs 130, 140, 150 during a vehicle communication window 525. The controller 212 defines the vehicle communication window 525 by activating the transmitter circuitry 206 at a transmission start time 530, providing the signal to the transmitter circuitry for transmission to the key fobs 130, 140, 150 for a transmission time duration 540, and deactivating the transmitter circuitry 206 at a transmission stop time 550. In accordance with the present embodiment, the controller 212 increases the reliability of communicating the vehicle event to the key fobs 130, 140, 150 by defining the vehicle communication window such that it is calculated to overlap the key fob communication windows of one or more of the key fobs 130, 140, 150 as described in more detail below.

Figure 6:
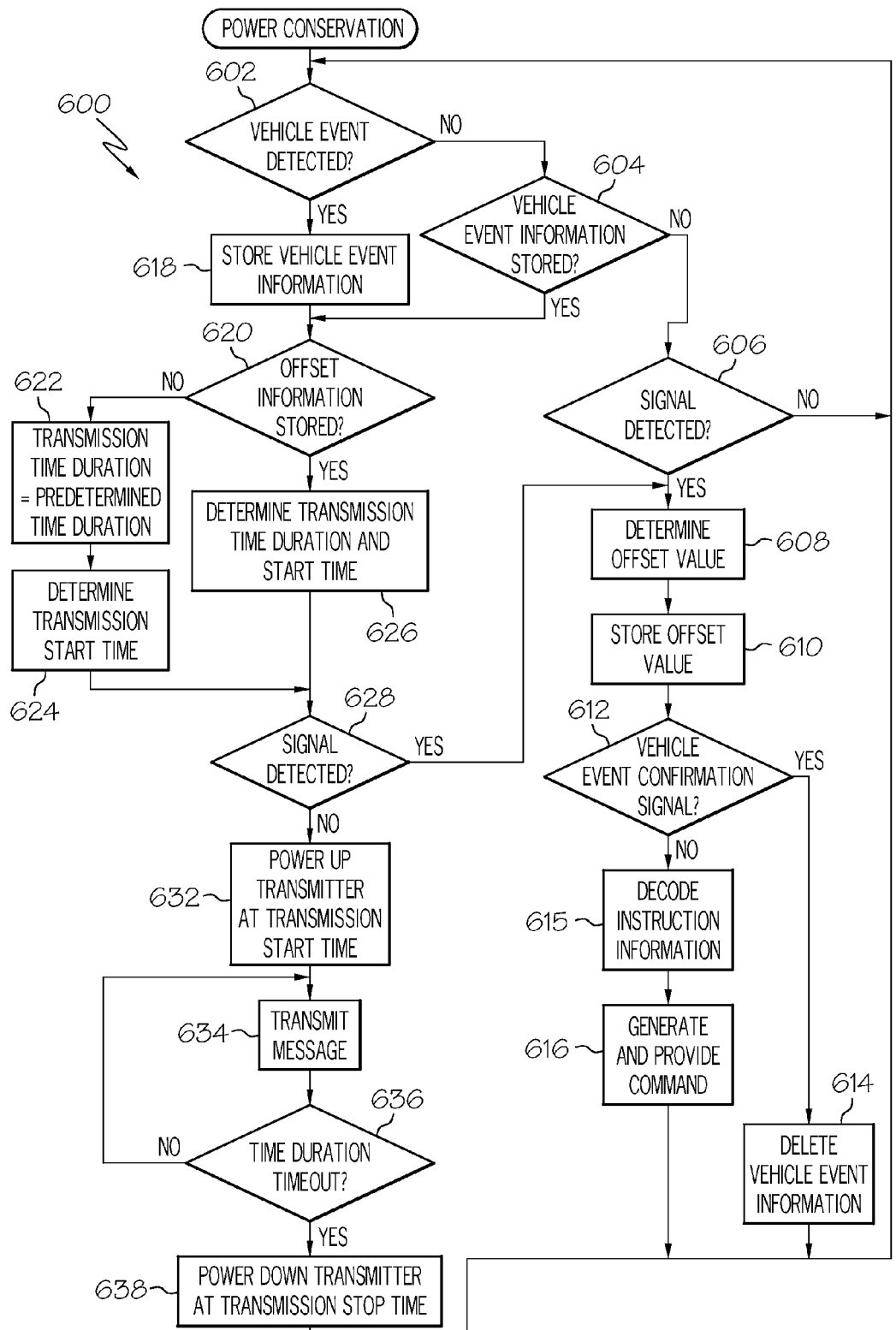
FIG. 6 illustrates a flowchart of the power conservation operation of the vehicle transceiver module of FIG. 2 in accordance with the embodiment of the present invention.

Referring to FIG. 6, a flowchart 600 of the power conservation operation of the controller 212 of the vehicle transceiver module 110 in accordance with the present embodiment begins by the controller 212 either detecting 602 a vehicle event which occurrence will be communicated to the key fobs 130, 140, 150, or determining 604 that vehicle event information is stored in the memory 210 that has not been communicated to the key fobs 130, 140, 105, or detecting 606 a signal from one of the key fobs 130, 140, 150.

As the receiver circuitry 204 is required to be responsive to signals from one of the key fobs 130, 140, 150 at any time, the power conservation operation depicted in the flowchart 600 provides appropriate signaling to the power control circuitry 218 to keep the receiver circuitry 204 active (i.e., powered ON or in a relatively high duty cycle operation) in order to detect 606 a signal from one of the key fobs 130, 140, 150 while activating and deactivating the transmitter circuitry 206 in accordance with the present embodiment. When a synchronous signal is detected 606 from one of the key fobs 130, 140, 150, an offset value is determined 608 from an offset time duration between an actual reception time of the synchronous signal from the one of the key fobs 130, 140, 150 and an expected reception time of the signal from the one of the key fobs 130, 140, 150 as measured by the controller 212 (e.g., one of the offset time durations 418, 420, 422 (FIG. 4)).

The offset value determined at step 608 is stored 610 in the memory 210 along with information identifying the one of the key fobs 130, 140, 150 from which the signal was received. When storing the offset value 610 in the memory, the offset value could be stored at a predetermined location in the memory 210 associated with the one of the key fobs 130, 140, 150 from which the signal was received, overwriting any offset value previously stored thereat. Alternatively, the offset value could be stored in the memory 210 as one of multiple offset values associated with the one of the key fobs 130, 140, 150 from which the signal was received, such that an immediately previous offset value remains also stored in the memory 210 as another one of the multiple offset values associated with the one of the key fobs 130, 140, 150 from which the signal was received. Further, additional information could be stored with each offset value, such as timing information indicating the expected reception time 505 (FIG. 5) used to calculate the offset value or information calculated by the controller 212 to determine the offset value.

If the controller 212 determines 612 that the signal received from the one of the key fobs 130, 140, 150 is a confirmation signal confirming that the one of the key fobs 130, 140, 150 received vehicle event information transmitted from the vehicle transceiver module 110, the controller 212 deletes 614 the corresponding vehicle event information stored in the memory 210 and processing returns to await detection 602 of a vehicle event, determination 604 that vehicle event information is stored in the memory 210, or detection 606 of another signal from one of the key fobs 130, 140, 150. While the description hereinabove for steps 612 and 614 contemplates confirmation of reception of the vehicle event information by one of the key fobs 130, 140, 150 as a condition for deleting 614 such vehicle event information from the memory 210, the system could alternatively be designed to assure reception of some or all of the vehicle event messages (as determined by, for example, the time or the nature of the vehicle event) at all of the key fobs 130, 140, 150 before deleting 614 such vehicle event messages from the memory 210.

When the controller 212 determines 612 that the signal received from the one of the key fobs 130, 140, 150 is not a confirmation signal confirming that vehicle event information was received by one of the key fobs 130, 140, 150, the signal provides instruction information for the vehicle 120 (e.g., unlock the doors, turn on the lights, etc.). The controller 212 then decodes the instruction information 615 and provides command signals 616 to the higher level vehicle controller for execution of vehicle functions in accordance with the received instruction information. Processing then returns to await detection 602 of a vehicle event, determination 604 that vehicle event information is stored in the memory 210, or detection 606 of another signal from one of the key fobs 130, 140, 150.

When a vehicle event is detected 602, vehicle event information corresponding to the detected vehicle event is stored 618 in the memory 210. For example, if activation of the vehicle security system is detected at step 602, vehicle event information representative of the security system activation is stored in the memory 210 at step 618. Processing then proceeds to transmit this information to one or more of the key fobs 130, 140, 150. If processing determines that vehicle event information is stored in the memory 210 at step 604, step 618 is skipped and processing also proceeds to transmit this information to one or more of the key fobs 130, 140, 150.

The controller 212 determines 620 whether offset values are stored for one or more of the key fobs 130, 140, 150. If no offset values are stored 620, a transmission time duration is set equal to a predetermined vehicle communication window 622. Given that the key fobs 130, 140, 150 activate their transceiver circuitry 304 for reception of a vehicle communication at regular intervals, the predetermined vehicle communication window is preferably sufficiently long to include at least one key fob communication window. A transmission start time is then determined 624 from the time duration and an expected reception time (e.g., referring back to FIG. 5, the transmission start time is an expected reception time 505 minus one half of the time duration 540 so that the vehicle communication window 525 is centered around the expected reception time 505).

When offset values are stored 620, a transmission time duration and a transmission start time are determined 626 in response to the stored offset values and the expected reception time in accordance with the present embodiment. The controller 212 then determines 628 whether a received signal is detected from one or more of the key fobs 130, 140, 150. When a received signal is detected 628, transmission of the vehicle event message is postponed to allow proper processing of the newly received signal. The controller 212 then proceeds to step 608 where an offset value is determined in response to the time the signal was detected at step 628.

When a received signal is not detected at step 628, the controller 212 provides 632 a first power control signal to the power control circuitry 218 to power up the transmitter circuitry 206 at a time determined by the offset values. The controller 212 then provides 634 vehicle event signals to the transmitter circuitry 206 for transmitting RF signals including the vehicle event message. The vehicle event signals are provided 634 by the controller 212 to the transmitter circuitry 206 until the transmission time duration times out 636. When the determined transmission time duration exceeds the transmission length of the data content alone, the additional transmit time may be comprised of repetitions of wakeup/preamble data or the required content can be repeated a sufficient number of times to meet or exceed the transmission time duration. After the transmission time duration times out 636, the controller 212 provides 638 a second power control signal to the power control circuitry 218 to power down the transmitter circuitry 206. Thus it can be seen that the controller 212 provides the second power control signal 638 to the power control circuitry 218 at a transmission stop time determined in response to the transmission start time and the transmission time duration.

After the controller 212 provides the second power control signal 638 to the power control circuitry 218 to power down the transmitter circuitry 206, processing returns to await detection 602 of another vehicle event, determination 604 that vehicle event information is stored in the memory 210, or detection 606 of a signal from one of the key fobs 130, 140, 150.

Figure 7:
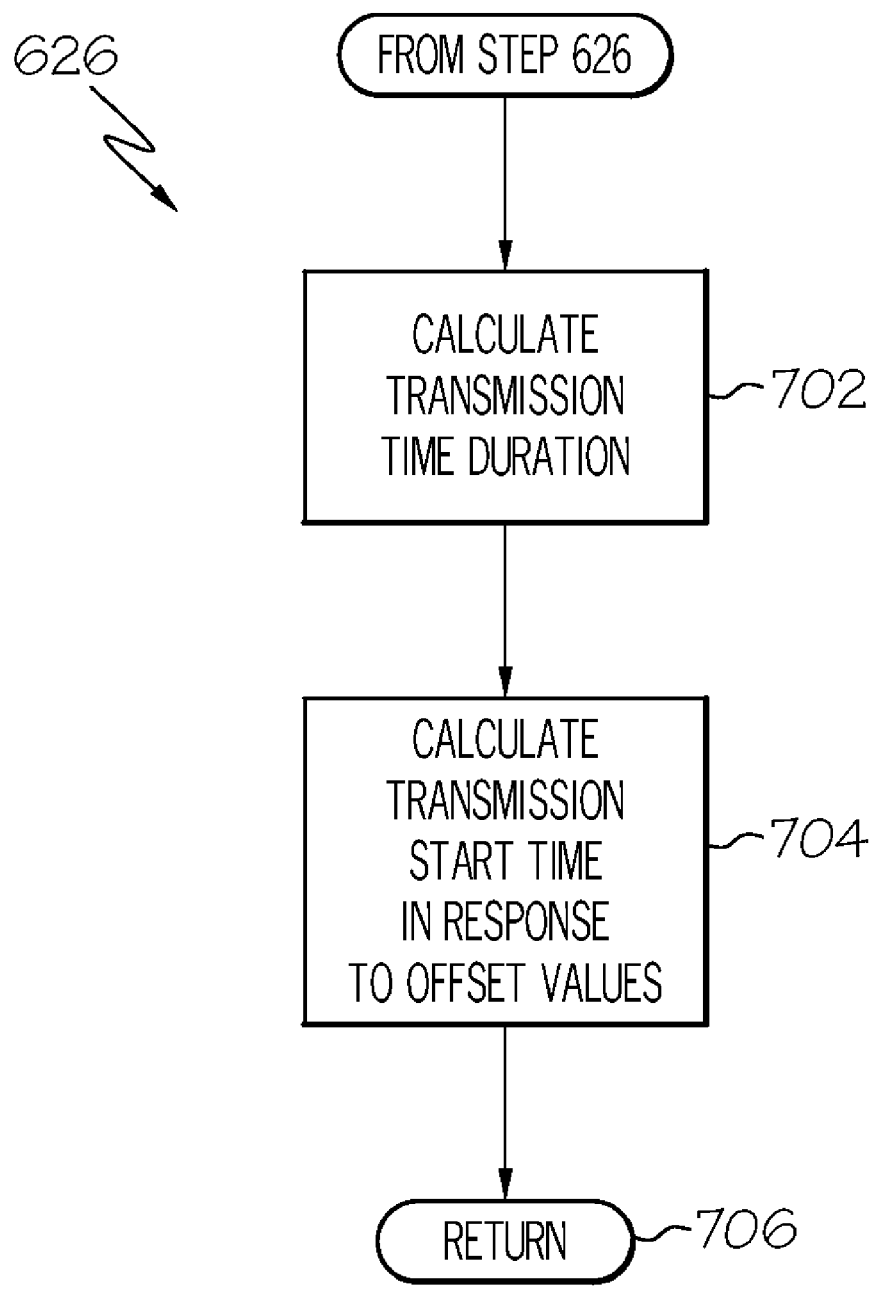
FIG. 7 illustrates a flowchart of the operation of the controller of the vehicle transceiver module of FIG. 2 for calculation of the transmission time duration and the transmission start time in accordance with a first alternate embodiment of the present invention.

Alternate methodologies for determining transmission start times and transmission time durations in accordance with the present invention are discussed hereinbelow in association with FIGS. 7 to 12. Referring to FIG. 7, details of step 626 of the flowchart 600 of FIG. 6 is shown in accordance with a first alternate embodiment.

In accordance with this first alternate embodiment, the transmission time duration is calculated 702 by the controller 212 in response to a difference between the expected reception time and a last reception time when a signal was last received from one of the key fobs 130, 140, 150. Therefore, the controller 212 retrieves one or more last reception times stored in the memory 210 as information associated with the one or more key fobs 130, 140, 150. For example, the controller 212 could select the oldest of the last reception times or the most recent of the last reception times stored in the memory 210 as the reception time utilized at step 702 for calculating the time duration.

Figure 8:
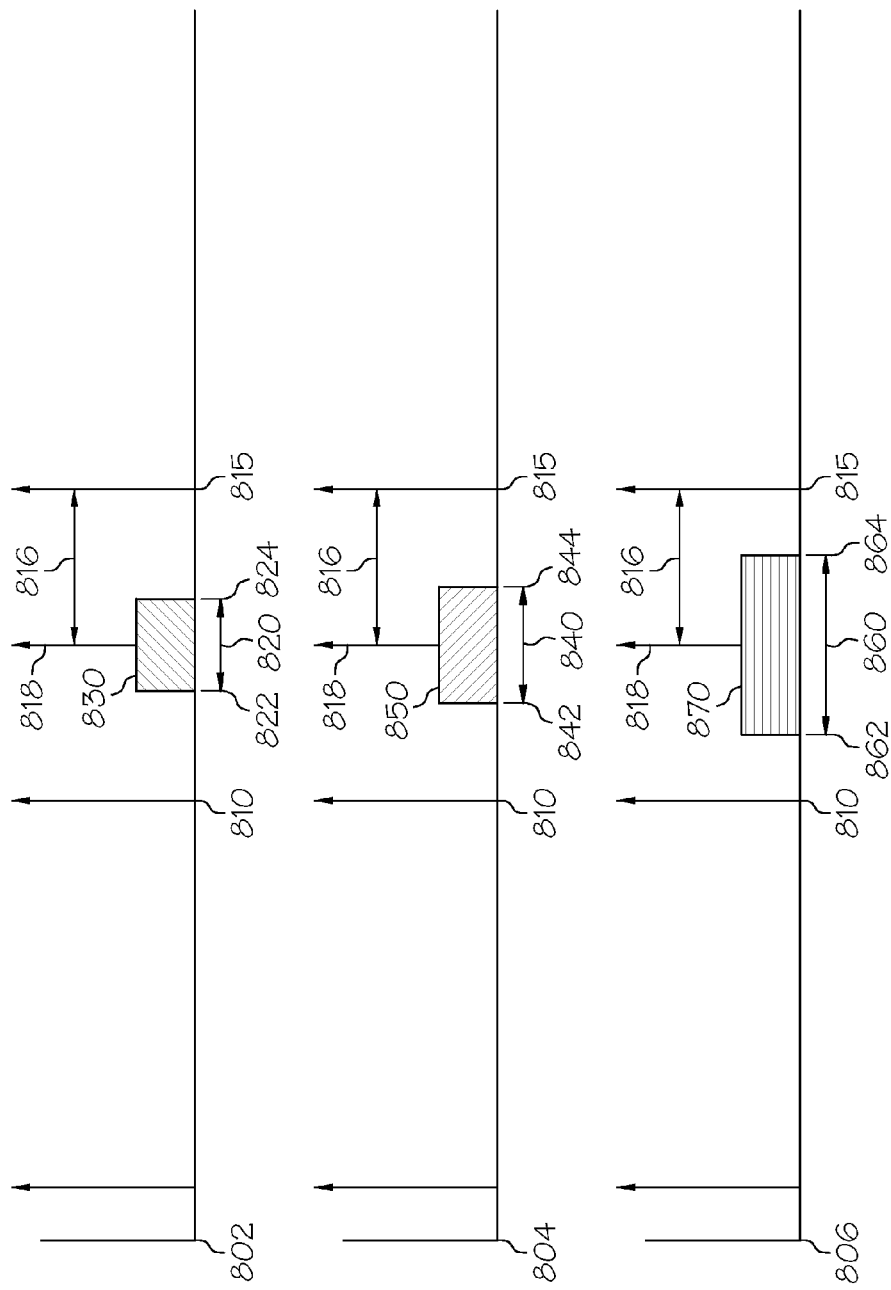
FIG. 8 illustrates a timing chart of the power conservation operation of FIG. 7 in accordance with the first alternate embodiment of the present invention.

Referring to FIG. 8, exemplary timing charts 802, 804 and 806 show the occurrence of a vehicle event at time 810 and transmission time durations 820, 840 and 860 calculated at step 702 of FIG. 7. The greater the difference between the last reception time and the expected reception time 815 used to calculate the transmission time duration 820, 840, 860, the wider the vehicle time window 830, 850, 870. As can be seen from the increased widths of the vehicle time windows 830, 850, 870, an extended transmission time duration 820, 840, 860 is provided for key fobs 130, 140, 150 based upon the last reception time to accommodate the greater potential for drift of the key fob communication window relative to the expected reception time due to the greater time since a last offset value was calculated.

Each transmission time duration 820, 840, 860 has a transmission start time 822, 842, 862 and a transmission stop time 824, 844, 864. Referring back to FIG. 7, after calculating the transmission time duration 702, the controller 212 calculates the transmission start time 704 in response to an offset value 816 (FIG. 8) and the transmission time duration. As can be seen from FIG. 8, the transmission start time 822, 842, 862 is half of the transmission time duration 820, 840, 860 less than a time 818 which is offset from the expected reception time 815 by the offset value 816. After calculating the transmission start time 704 (FIG. 7) processing returns 706 to step 628 of FIG. 6.

Figure 9:
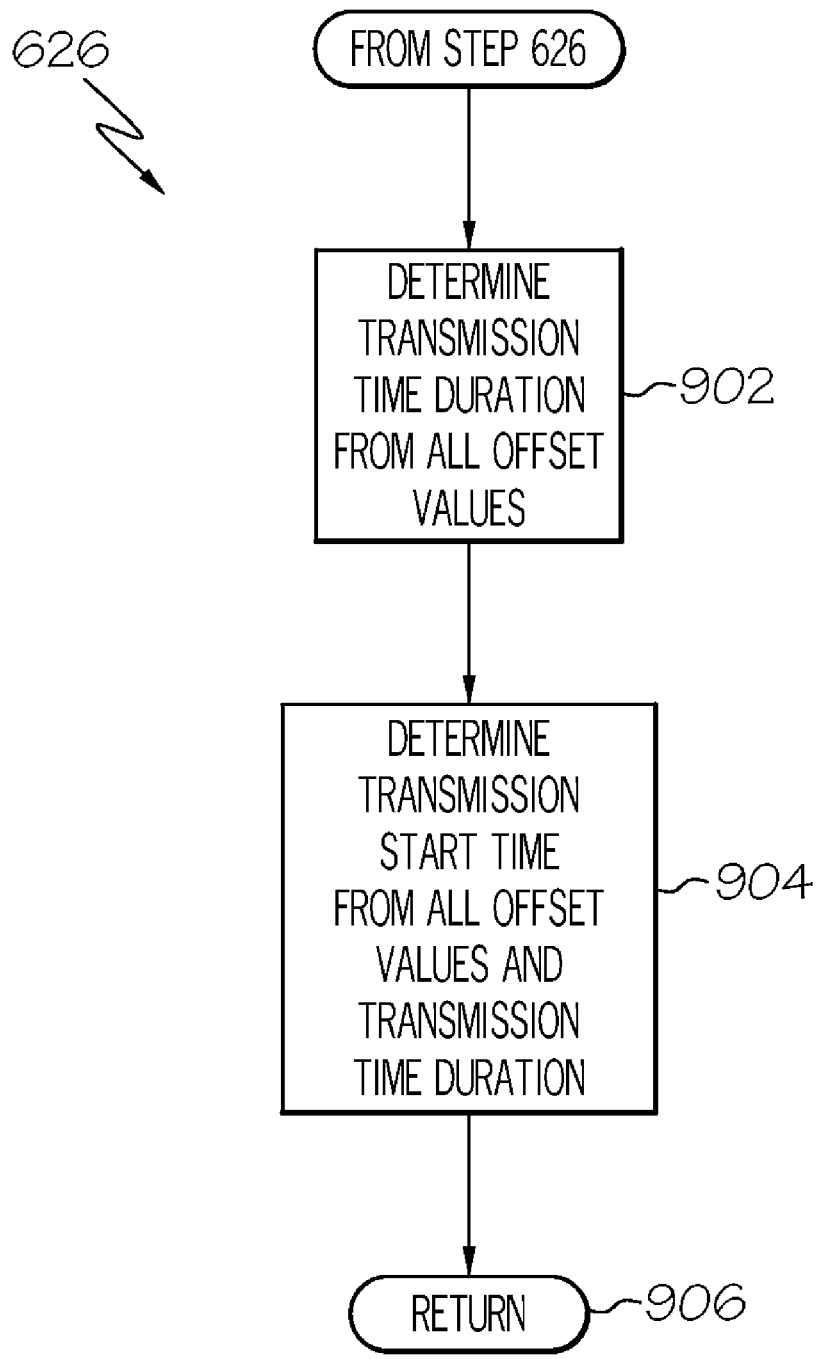
FIG. 9 illustrates a flowchart of the operation of the controller of the vehicle transceiver module of FIG. 2 for calculation of the transmission time duration and the transmission start time in accordance with a second alternate embodiment of the present invention.

Referring to FIG. 9, details of step 626 of the flowchart 600 of FIG. 6 is shown in accordance with a second alternate embodiment. In accordance with this second alternate embodiment, the transmission time duration is calculated 902 by the controller 212 in response to stored offset values from each of the key fobs 130, 140, 150. Therefore, the controller 212 retrieves the offset values stored in the memory 210 as information associated with each of the key fobs 130, 140, 150, wherein one offset value is stored in association with each of the key fobs 130, 140, 150. The calculation of the transmission time duration 902 could, for example, be performed by the controller 212 selecting the largest offset value of the offset values associated with each of the key fobs 130, 140, 150 or the controller 212 calculating an average of the offset values associated with each of the key fobs 130, 140, 150.

The controller 212 then calculates the transmission start time 904 in response to one or more of the stored offset values and the calculated transmission time duration. After calculating the transmission start time 904 processing returns 906 to step 628 of FIG. 6.

Figure 10:
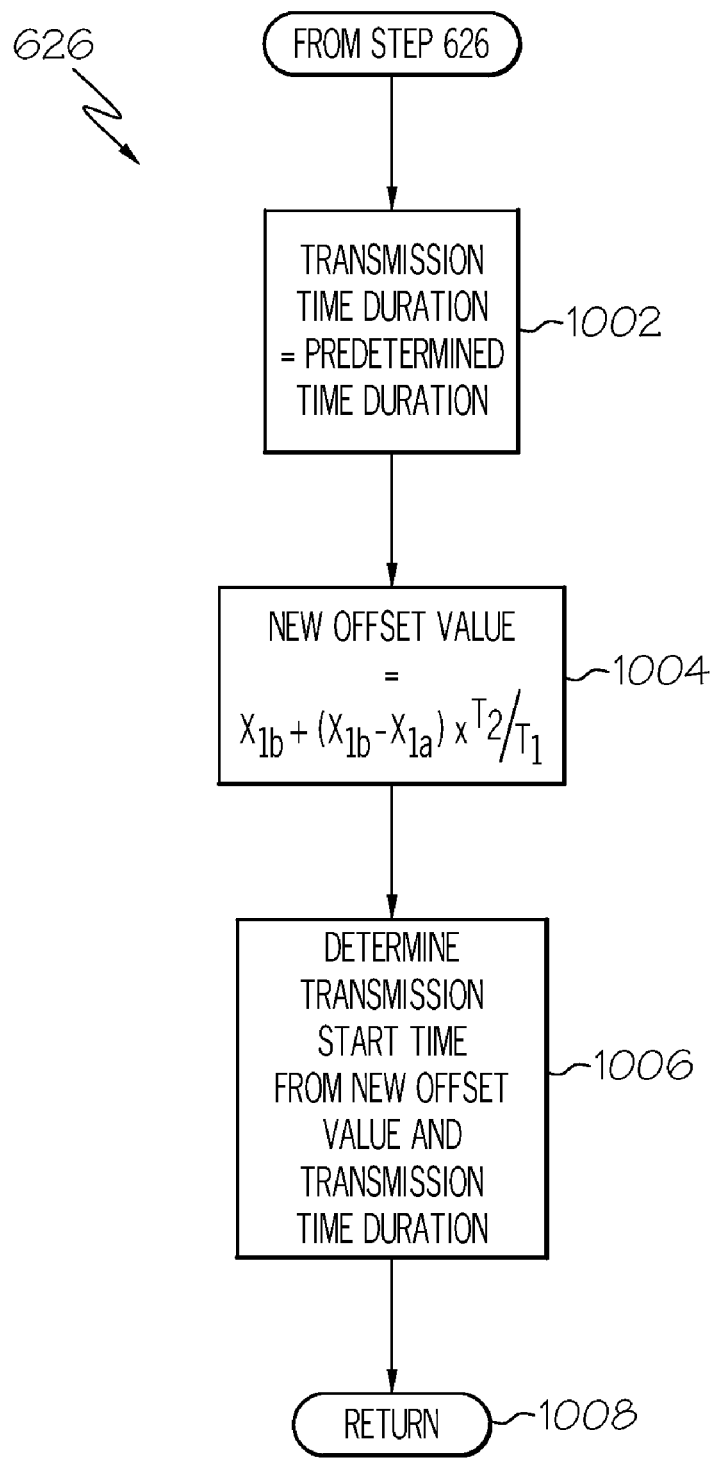
FIG. 10 illustrates a flowchart of the operation of the controller of the vehicle transceiver module of FIG. 2 for calculation of the transmission time duration and the transmission start time in accordance with a third alternate embodiment of the present invention.

Referring to FIG. 10, details of step 626 of the flowchart 600 of FIG. 6 is shown in accordance with a third alternate embodiment wherein a shift in the offset time per unit time is used to accurately estimate a new offset value based upon a time between a vehicle event and previous offset values. In accordance with this third alternate embodiment, the controller 212 sets the transmission time duration equal to the predetermined time duration 1002 because the calculation of a new offset value accommodates for any time dependent drift.

Figure 11:
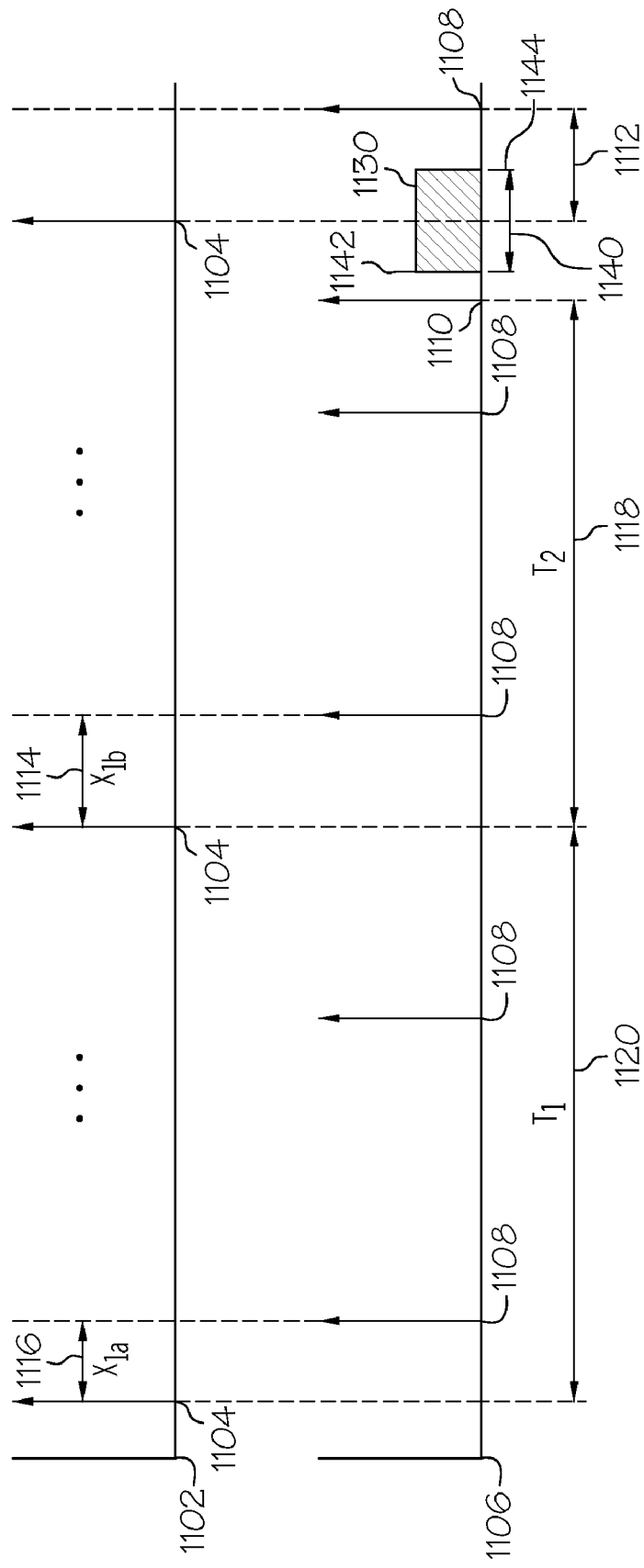
FIG. 11 illustrates a timing chart of the power conservation operation of FIG. 10 in accordance with the third alternate embodiment of the present invention.

Referring to FIG. 11, an exemplary timing chart 1100 depicts a timing diagram 1102 for transmissions of the key fob 130 at times 1104 and a timing diagram 1106 for the vehicle transceiver module 110 at expected reception times 1108. A vehicle event occurs at time 1110 and the controller 212 calculates a new offset 1112 at step 1004 (FIG. 10) by adding a second offset value $X_{1b}$ 1114 to a multiple of a difference between a first offset value $X_{1a}$ 1116 and the second offset value $X_{1b}$ 1114 by a ratio of a second time interval $T_2$ 1118 between the transmission 1104 from which the second offset value $X_{1b}$ 1114 was derived and the vehicle event 1110 and a first time interval $T_1$ 1120 between the transmission 1104 from which the first offset value $X_{1a}$ 1116 was derived and the transmission 1104 from which the second offset value $X_{1b}$ 1114 was derived. Thus, a vehicle communication window 1130 is created around a time determined in response to the expected reception time 1108 and the new offset value 1112 having a transmission time duration of 1140 with a transmission start time 1142 and a transmission stop time 1144.

After calculating the new offset time 1004 (FIG. 10), the controller 212 calculates 1006 (FIG. 10) the transmission start time 1142 in response to the new offset value 1112, the expected reception time 1108 and the transmission time duration 1144. As can be seen from FIG. 11, the transmission start time 1142 is half of the transmission time duration 1140 less than a time 1150 which is offset from the expected reception time 1108 by the new offset value 1112. After calculating the transmission start time 1006 (FIG. 10) processing returns 1008 to step 628 of FIG. 6.

Referring to FIG. 12, a timing chart 1200 of a power conservation operation of the vehicle transceiver module 110 in accordance with a fourth alternate embodiment includes timing diagrams 1102 and 1106 as shown in FIG. 11. This fourth alternate embodiment combines the first and third alternate embodiments. In accordance with the third alternate embodiment, a new offset value 1112 is calculated. And in accordance with the first alternate embodiment, the transmission time duration 1202 is calculated based upon the second time interval $T_2$ 1118 between the transmission 1104 from which the second offset value $X_{1b}$ 1114 was derived and the vehicle event 1110 to accommodate the greater potential for drift of the key fob communication window relative to the expected reception time 1108 due to the time since the last offset value $X_{1b}$ 1114 was calculated. The transmission time duration 1202 is bounded by a calculated transmission start time 1206 and a transmission stop time 1208.

Thus it can be seen that power conservation in accordance with the embodiments of the present invention allows for a short duty cycle for the transceiver circuitry 304 to minimize energy consumption thereby while allowing an alert to be sent from the vehicle transceiver module 110 to the key fobs 130, 140, 150 after the detection of a vehicle event, thereby implementing an early alert transmission from the vehicle transceiver module 110 with minimal average energy use at the key fobs 130, 140, 150 and the vehicle transceiver module 110.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for providing power conservation in a first transceiver in synchronous communication with a second transceiver, the method comprising the steps of:
    determining an offset value for the second transceiver in response to an offset time duration between a reception time of a signal from the second transceiver and a first expected reception time of the signal from the second transceiver;

storing the offset value along with information identifying the second transceiver; and powering up the first transceiver for transmission of a signal to the second transceiver at a transmission start time determined in response to the offset value and a second expected reception time.

2. The method in accordance with claim 1 further comprising the step of powering down the first transceiver at a transmission stop time determined in response to the transmission start time and a transmission time duration.

3. The method in accordance with claim 2 wherein the step of storing the offset value along with the information identifying the second transceiver further comprises the step of storing the first expected reception time as a last reception time of the signal from the second transceiver, and wherein the step of powering down the first transceiver comprises the steps of:

calculating the transmission time duration in response to the last reception time of the signal from the second transceiver and the second expected reception time of the signal from the second transceiver; and powering down the first transceiver at the transmission stop time determined in response to the transmission start time and the transmission time duration.

4. The method in accordance with claim 1 wherein the second transceiver is one of a plurality of second transceivers, the method comprising the steps of:

determining a plurality of offset values, each of the plurality of offset values corresponding to one of the plurality of second transceivers and each of the plurality of offset values determined in response to the offset time duration between a reception time of a signal from a corresponding one of the plurality of second transceivers and the first expected reception time of a most recent reception of the signal from the corresponding one of the plurality of second transceivers;

storing each of the plurality of offset values along with transceiver identification information identifying the corresponding one of the plurality of second transceivers corresponding thereto; and powering up the first transceiver for transmission of a signal to one or more of the plurality of second transceivers at the transmission start time determined in response to all of the plurality of offset values and the second expected reception time.

5. The method in accordance with claim 4 further comprising the steps of:

calculating a transmission time duration in response to all of the plurality of offset values; and powering down the first transceiver at a transmission stop time determined in response to the transmission start time and the transmission time duration.

6. The method in accordance with claim 5 wherein the step of storing each of the plurality of offset values comprises the step of storing each of the plurality of offset values along with the transceiver identification information identifying the corresponding one of the plurality of second transceivers corresponding thereto and a last reception time for a signal received from the corresponding one of the plurality of second transceivers, the last reception time identifying the first expected reception time of the signal from the corresponding one of the plurality of second transceivers when the signal was last received from the corresponding one of the plurality of second transceivers, and wherein the step of calculating the transmission time duration comprises the step of calculating the transmission time duration in response to all of the plurality of offset values, the last reception time of all of the plurality of second transceivers and the second expected reception time.

7. The method in accordance with claim 1 wherein the step of storing the offset value comprises the step of storing the offset value at a predetermined location in a storage device associated with the second transceiver, overwriting the offset value previously stored therein.

8. The method in accordance with claim 1 wherein the step of storing the offset value comprises the step of storing the offset value as one of multiple offset values associated with the second transceiver wherein an immediately previous offset value is stored as another one of the multiple offset values associated with the second transceiver.

9. The method in accordance with claim 8 wherein the step of powering up the first transceiver comprises the step of powering up the first transceiver for transmission of the signal to the second transceiver at the transmission start time, wherein the transmission start time is determined in response to the second expected reception time and a difference between the offset value and the immediately previous offset value.

10. The method in accordance with claim 9 wherein the step of storing the offset value as one of the multiple offset values associated with the second transceiver comprises the step of storing the first expected reception time as a reception time of the signal from the second transceiver associated with the offset value, the method further comprising the steps of:

calculating a transmission time duration in response to the reception time of the signal from the second transceiver associated with the offset value stored immediately prior to the second expected reception time of the signal from the second transceiver and the second expected reception time; and powering down the first transceiver at a transmission stop time determined in response to the transmission start time and the transmission time duration.

11. A vehicle transceiver module for use in a synchronous communication system including the vehicle transceiver module and one or more key fobs, each of the one or more key fobs including a key fob transceiver for transmitting a signal, the vehicle transceiver module comprising:

transceiver circuitry for transmitting a signal to the key fob transceiver and for receiving the signal transmitted by the key fob transceiver;

a controller coupled to the transceiver circuitry for determining an offset value associated with one of the one or more key fobs in response to an offset time duration between a reception time of the signal from the one of the one or more key fobs and a first expected reception time of the signal from the one of the one or more key fobs;

a storage device coupled to the controller and storing the offset value along with information identifying the one of the one or more key fobs associated therewith; and power control circuitry coupled to the transceiver circuitry for providing operational power thereto, wherein the controller is also coupled to the power control circuitry and provides a begin transmission signal to the power control circuitry to power up the transceiver circuitry for transmission of the signal to one of the one or more key fobs at a transmission start time determined by the controller in response to the offset value associated with the one of the one or more key fobs and a second expected reception time.

12. The vehicle transceiver module in accordance with claim 11 wherein the controller provides an end transmission signal to the power control circuitry to power down the transceiver circuitry for power conservation at a transmission stop time determined in response to the transmission start time and a transmission time duration.

13. The vehicle transceiver module in accordance with claim 11 wherein the controller calculates a transmission time duration in response to two or more offset values stored in the storage device, each of the two or more offset values being associated with different ones of the one or more key fobs and provides an end transmission signal to the power control circuitry to power down the transceiver circuitry for power conservation at a transmission stop time determined in response to the transmission start time and the transmission time duration.

14. The vehicle transceiver module in accordance with claim 13 wherein the controller calculates the transmission time duration in response to all of the two or more offset values stored in the storage device.

15. The vehicle transceiver module in accordance with claim 14 wherein the storage device stores a last reception time of the signal from each of the one or more key fobs in response to receiving the first expected reception time of the signal from one of the one or more key fobs from the controller when the signal was last received from the one of the one or more key fobs, the storage device storing the last reception time along with the offset value associated with the one of the one or more key fobs and the information identifying the one of the one or more key fobs, and wherein the controller calculates the transmission time duration in response to all of the two or more offset values, the last reception time associated with all of the one or more key fobs and the second expected reception time.

16. The vehicle transceiver module in accordance with claim 11 wherein the storage device, when receiving the offset value associated with the one of the one or more key fobs from the controller for storing therein, stores the offset value as one of multiple offset values associated with the one of the one or more key fobs, an immediately previous offset value being stored as another one of the multiple offset values associated with the one of the one or more key fobs, and wherein the controller calculates the transmission start time in response to the second expected reception time and a difference between the offset value and the immediately previous offset value.

17. The vehicle transceiver module in accordance with claim 16 wherein the storage device when receiving the offset value for storage therein also receives the first expected reception time from the controller for storing therein, the storage device storing the first expected reception time as a reception time of the signal from the one of the one or more key fobs associated with the offset value being stored in the storage device, and wherein the controller calculates a transmission time duration in response to the reception time of the signal from the one of the one or more key fobs associated with the offset value stored immediately prior to the second expected reception time of the signal from the one of the one or more key fobs and the second expected reception time and provides an end transmission signal to the power control circuitry to power down the transceiver circuitry for power conservation at a transmission stop time determined in response to the transmission start time and the transmission time duration.

18. A key fob for two-way communication with a vehicle transceiver module including a vehicle transceiver for transmitting a first radio frequency (RF) signal, the key fob comprising:
    transceiver circuitry for receiving the first RF signal transmitted by the vehicle transceiver and for transmitting a second RF signal to the vehicle transceiver;
    power control circuitry coupled to the transceiver circuitry for providing operational power thereto in response to receiving a transceiver power control signal;
    a motion detection device for generating a motion detected signal in response to detecting movement of the key fob; and
    a controller coupled to the motion detection device and the power control circuitry for providing the transceiver power control signal to the power control circuitry only within a predetermined time period after receiving the motion detected signal from the motion detection device.

19. The key fob in accordance with claim 18 wherein the predetermined time period is defined in accordance with a software configurable value.

20. The key fob in accordance with claim 18 wherein the predetermined time period is ten hours.

* * * * *